(12) United States Patent
Buelow et al.

(10) Patent No.: US 7,578,285 B2
(45) Date of Patent: Aug. 25, 2009

(54) HYDROCARBON ADSORPTION FILTER FOR AIR INTAKE SYSTEM EVAPORATIVE EMISSION CONTROL

(75) Inventors: Mark Thomas Buelow, Phillipsburg, NJ (US); Jeffrey Barmont Hoke, North Brunswick, NJ (US); John Joseph Steger, Pittstown, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 0 days.

(21) Appl. No.: 11/281,349

(22) Filed: Nov. 17, 2005

(65) Prior Publication Data

US 2007/0107701 A1    May 17, 2007

(51) Int. Cl.
*F02M 37/20* (2006.01)
*F02M 35/10* (2006.01)
(52) U.S. Cl. .................. 123/516; 123/518; 123/184.61
(58) Field of Classification Search .................. 123/516, 123/518–520, 184.61; 96/134, 135, 147, 96/154; 55/315, 318, 516, 518, 519, 385.3
See application file for complete search history.

(56) References Cited

U.S. PATENT DOCUMENTS

| | | | |
|---|---|---|---|
| 3,639,280 A * | 2/1972 | Lynch et al. ............... 252/88.2 |
| 3,727,597 A * | 4/1973 | Hensler ..................... 123/519 |
| 3,730,158 A | 5/1973 | St. Armand |
| 3,838,673 A * | 10/1974 | Csicsery et al. .......... 123/179.8 |
| 4,027,367 A | 6/1977 | Rondeau |
| 4,099,943 A * | 7/1978 | Fischman et al. ............. 55/487 |
| 4,261,716 A | 4/1981 | Schwartz et al. |
| 4,261,717 A | 4/1981 | Belore et al. |
| 4,276,058 A | 6/1981 | Dinsmore |
| 4,276,864 A | 7/1981 | Waschkuttis |
| 4,331,456 A | 5/1982 | Schwartz et al. |
| 4,338,101 A | 7/1982 | Tuttle |
| 4,418,662 A * | 12/1983 | Engler et al. ................. 96/133 |
| 4,711,009 A * | 12/1987 | Cornelison et al. ............ 29/890 |
| 4,783,962 A | 11/1988 | Grein |
| 4,985,210 A | 1/1991 | Minami |
| 5,051,244 A | 9/1991 | Dunne et al. |

(Continued)

FOREIGN PATENT DOCUMENTS

CN    1059701 A    3/1992

(Continued)

OTHER PUBLICATIONS

Society of Automotive Engineers Publication No. 920847, Heimrich et al., Feb. 24-28, 1992.

(Continued)

*Primary Examiner*—Thomas N Moulis
(74) *Attorney, Agent, or Firm*—Bronwen M. Loeb; Drinker Biddle & Reath

(57) ABSTRACT

The present invention is directed to the use of an improved hydrocarbon adsorbent coating for the treatment of evaporative emissions from a motor vehicle. More specifically, one or more hydrocarbon adsorbents, in accordance with the present invention, can be coated to any surface area of an air intake system to trap hydrocarbon vapors before they can escape to the atmosphere, through said air intake system. In another embodiment, one or more hydrocarbon adsorbents can be incorporated in the air filter of an air intake system.

15 Claims, 1 Drawing Sheet

U.S. PATENT DOCUMENTS

| | | | |
|---|---|---|---|
| 5,094,218 A | 3/1992 | Everingham et al. | |
| 5,125,231 A | 6/1992 | Patil et al. | |
| 5,158,753 A | 10/1992 | Take et al. | |
| 5,207,734 A | 5/1993 | Day et al. | |
| 5,241,940 A | 9/1993 | Gates, Jr. | |
| 5,603,215 A | 2/1997 | Sung et al. | |
| 5,636,619 A | 6/1997 | Poola et al. | |
| 5,647,333 A | 7/1997 | Mukai | |
| 6,074,973 A * | 6/2000 | Lampert et al. | 502/60 |
| 6,171,556 B1 | 1/2001 | Burk et al. | |
| 6,391,075 B1 | 5/2002 | Meiji et al. | |
| 6,416,562 B1 | 7/2002 | Shibuya et al. | |
| 6,432,179 B1 | 8/2002 | Lobovsky et al. | |
| 6,464,761 B1 | 10/2002 | Bugli | |
| 6,474,312 B1 | 11/2002 | Zulauf et al. | |
| 6,497,848 B1 | 12/2002 | Deeba et al. | |
| 6,540,815 B1 | 4/2003 | Hiltzik et al. | |
| 6,543,427 B2 | 4/2003 | Kawasaki | |
| 6,592,655 B2 | 7/2003 | Iriyama et al. | |
| 6,692,555 B2 * | 2/2004 | Oda et al. | 96/134 |
| 6,736,871 B1 | 5/2004 | Green et al. | |
| 6,792,749 B2 | 9/2004 | Ueno et al. | |
| 6,817,345 B2 | 11/2004 | Lawrence | |
| 6,835,234 B2 | 12/2004 | Leffel et al. | |
| 6,863,984 B2 | 3/2005 | Hoke et al. | |
| 6,887,343 B2 * | 5/2005 | Schukar et al. | 156/195 |
| 6,997,977 B2 * | 2/2006 | Dallas et al. | 96/153 |
| 2001/0047790 A1 | 12/2001 | Karlsson | |
| 2002/0029693 A1 | 3/2002 | Sakakibara et al. | |
| 2002/0043156 A1 | 4/2002 | Shea | |
| 2002/0150805 A1 | 10/2002 | Stenersen et al. | |
| 2002/0150806 A1 | 10/2002 | Stenersen et al. | |
| 2002/0157359 A1 | 10/2002 | Stenersen et al. | |
| 2003/0024506 A1 | 2/2003 | Oda et al. | |
| 2003/0037675 A1 | 2/2003 | Gillingham et al. | |
| 2003/0106293 A1 | 6/2003 | Tanaka et al. | |
| 2003/0166466 A1 * | 9/2003 | Hoke et al. | 502/439 |
| 2003/0192512 A1 | 10/2003 | Luley et al. | |
| 2004/0011197 A1 | 1/2004 | Wernholm et al. | |
| 2004/0069146 A1 | 4/2004 | Carter et al. | |
| 2004/0099253 A1 | 5/2004 | Tschantz | |
| 2004/0118387 A1 | 6/2004 | Lawrence | |
| 2004/0134353 A1 | 7/2004 | Gillingham et al. | |
| 2004/0149129 A1 | 8/2004 | Petersson et al. | |
| 2004/0182240 A1 | 9/2004 | Bause et al. | |
| 2004/0211320 A1 | 10/2004 | Cain | |
| 2004/0226440 A1 | 11/2004 | Foong et al. | |
| 2004/0250680 A1 | 12/2004 | Wright | |
| 2004/0255783 A1 | 12/2004 | Graham et al. | |
| 2004/0255911 A1 | 12/2004 | Abdolhosseini et al. | |
| 2005/0081717 A1 | 4/2005 | Meiller et al. | |
| 2006/0272508 A1 | 12/2006 | Hoke et al. | |
| 2007/0104623 A1 * | 5/2007 | Dettling et al. | 422/177 |

FOREIGN PATENT DOCUMENTS

| | | |
|---|---|---|
| EP | 1 110 593 | 10/2000 |
| EP | 1 273 789 | 6/2001 |
| EP | 1 321 659 | 7/2003 |
| WO | WO01/12973 A1 | 2/2001 |
| WO | WO2004/101115 A1 | 11/2004 |

OTHER PUBLICATIONS

U.S. Appl. No. 11/282,814, Hoke et al., "Hydrocarbon Adsorption Method and Device for Controlling Evaporative Emissions from the Fuel Storage System of Motor Vehicles", Nov. 18, 2005.

U.S. Appl. No. 11/281,629, Hoke et al., "Improved Hydrocarbon Adsorption Slurry Washcoat Formulation for Use at Low Temperature", Nov. 17, 2005.

U.S. Appl. No. 11/281,622, Hoke et al., "Hydrocarbon Adsorption Trap for Controlling Evaporative Emissions from EGR Valve", Nov. 17, 2005.

Automotive Engineering International Magazine Online, Frendenberg Norwoven, "Air Filters", Apr. 2005, www.sae.org/automag.

Automotive Engineering International Magazine Online, Mann + Hummel, "Hydrocarbon Adsorption", Apr. 2005, p. 154, www.sae.org/automag.

English language Abstract for CN 1059701A, Kuixi et al., "High Silicon Beta Zeolite", Mar. 25, 1992.

English language Abstract for EP 1 321 659 A2, Rhode et al., "Air Intake Device For An Internal Combustion Engine", Jul. 25, 2003.

PCT/US2006/044772 SearchR, Apr. 12, 2007, Mark Thomas Buelow et al.

* cited by examiner

HYDROCARBON ADSORPTION FILTER FOR AIR INTAKE SYSTEM EVAPORATIVE EMISSION CONTROL

FIELD OF THE INVENTION

This invention is directed to a method and device for controlling evaporative hydrocarbon emissions from motor vehicles. More specifically, this invention is directed to a method and device for adding hydrocarbon adsorption functionality to a motor vehicle's air filter with the intent to capture evaporative fuel emissions before they are released to the atmosphere.

BACKGROUND OF THE INVENTION

Evaporative emission regulations for vehicles require the control of polluting substances (primarily hydrocarbons) from the vehicle as the vehicle sits unused. Evaporative emissions can leak out of a vehicle from many sources including the air intake system, fuel tank, and exhaust gas recirculation (EGR) system. In the past, only the evaporative emissions from the fuel tank and fuel delivery system were captured, such as with carbon-filled canisters. However, with increasing emission regulations it has become necessary to expand evaporative emission capture technology to other vehicle components such as the air intake system.

It has been found that a significant amount of volatile hydrocarbons from several sources collect in the air intake system of the automobile engine after the engine has been shut off. These hydrocarbons are then discharged into the atmosphere after the engine has been shut off. Prior art systems and methods devote relatively little attention to prevention of the emissions of such hydrocarbons through the air induction system of the engine since the amounts of such emissions are relatively small as compared to the emissions of hydrocarbons from the fuel system and the exhaust gas stream which would pass into the atmosphere if left untreated. Nevertheless, in view of the increasingly stringent federal and state regulations mandating the elimination of all emissions of uncombusted hydrocarbons in the atmosphere to the extent technically feasible, it is desirable to provide equipment to adsorb such hydrocarbons.

A significant portion of a vehicles evaporative emissions are emitted from the air intake system during the vehicles off-cycle as a result of fuel injector leakage, residual fuel puddle evaporation, and blow-by gas from the PVC system. These substances need to be retained within the air intake system until the powertrain is again used when the retention system will give up the harmful substances to be consumed and controlled through the normal exhaust emission control systems.

There are several ways to control the outward flow of pollutants from the air intake system of an automobile. One such technique is the careful shaping of the ducting and filter box. However, this method is often not sufficient to meet the regulatory requirements. Accordingly, other methods must be used such as the incorporation of systems in the air intake system that use some form of carbon to absorb the pollutants during the rest cycle. When the vehicle is next started, the in-rushing air will draw the pollutants from the adsorbent and deal with them through the normal exhaust system pollution controls. This inward air rush also regenerates the adsorption systems so that they may be reused. Unfortunately, these extra adsorption systems add cost, weight and complexity to a vehicle and often restrict the air flow.

In additional efforts to reduce inadvertent evaporative emissions from the air intake system, many types of filters have been developed. Examples of filters for use in the intake system of a vehicle are found in U.S. Pat. No. 6,432,179 to Lobovsky et al. and U.S. Patent Application Publication No. U.S. 2002/0029693 to Sakakibara et al., both of which are incorporated herein by reference. The publication of Sakakibara et al. discloses several embodiments of hydrocarbon adsorbing devices having a case surrounding an inner cylinder portion. A hydrocarbon adsorbent material is provided in a chamber defined by the case and the inner cylinder portion. The inner cylinder portion has a central bore that extends through its length to permit induction air to pass therethrough, and also has windows that allow any hydrocarbons in the induction system to pass through a filter surrounding the inner cylinder portion to the hydrocarbon adsorbent material in the chamber to be adsorbed thereby.

U.S. patent application Publication Ser. No. US 2002/0043156 A1 discloses a housing securing an air filter having an air stream inlet and an air stream outlet. The air filter comprises a filter media disposed on a support that is disposed within, or secured to, the housing and an air permeable hydrocarbon adsorbing material is disposed between the filter media and the support at the air stream outlet end of the filter. According to the publication, the hydrocarbon adsorbent can be any suitable hydrocarbon adsorbing material. However, only activated carbon cloth, woven carbon fibers and a spun bound material impregnated with carbon powder or containing carbon granules, are exemplified.

EP 1110 593 A1 is similar to the U.S. Patent Application Publication discussed above. The EP Patent Application discloses an air filter assembly including a housing and a plurality of filter layers disposed in the housing. One of the filter layers is a carbon impregnated polyurethane foam layer to remove hydrocarbon vapors diffusing through an air inlet to the filter when the engine is shut-off.

Furthermore, systems and methods for adsorbing uncombusted hydrocarbons in the exhaust gas stream of an automobile are also well known. These systems and methods are particularly useful for adsorbing uncombusted hydrocarbons emitted during the cold start of the automobile engine.

For example, U.S. Pat. No. 4,985,210 is directed to an exhaust gas purifying apparatus for an automobile employing a three-way catalyst with either a Y-type zeolite or a mordenite used in a hydrocarbon trap upstream of the three-way catalyst. In the embodiment of FIG. 2of U.S. Pat. No. 4,985, 210, a bed of activated carbon is disposed upstream of an adsorbent zone. A solenoid-operated valve mechanism serves to direct the exhaust gas stream either through or around the activated carbon bed, depending on the temperature of the exhaust gas stream, and then through the adsorbent zone and the three-way catalyst.

U.S. Pat. No. 5,051,244 is directed to a process for treating an engine exhaust gas stream in which the gas stream is directed through a molecular sieve in an adsorbent zone during the cold-start phase of engine operation. When the hydrocarbons begin to desorb, the adsorbent zone is by-passed until the catalyst is at its operating temperature, at which point the gas stream is again flowed through the adsorbent zone to desorb hydrocarbons and carry them to the catalyst zone. A paper by M. Heimrich, L. Smith and J. Kotowski entitled Cold-Start Hydrocarbon Collection for Advanced Exhaust Emission Control, SAE Publication Number 920847, discloses an apparatus which functions in a manner similar to that of U.S. Pat. No. 5,051,244.

U.S. Pat. No. 5,125,231 discloses an engine exhaust system for reducing hydrocarbon emissions, including the use of beta zeolites as hydrocarbon adsorbents. Zeolites having a silica/alumina ratio in the range of 70/1 to 200/1 are preferred adsorbents. The apparatus includes by-pass lines and valves to direct exhaust gases from a first converter directly to a second converter during cold-start operation and when the first converter reaches its light-off temperature, to either by-pass the second converter or recycle effluent from it to the first converter.

U.S. Pat. No. 5,158,753 discloses an exhaust gas purifying device comprising: a catalyst device installed in the exhaust gas path of an internal combustion engine for treating the exhaust gas of the engine; an adsorbing device installed in the exhaust gas path between the catalyst device and the internal combustion engine, for treating the exhaust gas of the engine. One embodiment includes a heat exchanger for performing heat transfer between the exhaust gas flowing from the internal combustion engine to the adsorbing device and the exhaust gas flowing from the adsorbing device to the catalyst device. Alternatively, the catalyst device includes a catalyst secured in the low-temperature-side gas flow path of a heat exchanger, and the exhaust gas flowing from the internal combustion engine to the adsorbing device is allowed to flow to the high-temperature-side gas flow path of the heat exchanger.

U.S. Pat. No. 6,171,556 discloses a method and apparatus for treating an exhaust gas stream containing hydrocarbons and other pollutants. The method comprises the steps of flowing the exhaust gas stream through a catalytic member comprising a monolith body having a first catalyst zone and a second catalyst zone therein to contact a catalyst in a first catalyst zone to convert at least some of the pollutants in the exhaust gas stream into innocuous products. The exhaust gas stream is then discharged from the catalytic member and flowed through an adsorbent zone to adsorb at least some of the hydrocarbon pollutants with an adsorbent composition. The exhaust gas stream is discharged from the adsorbent zone and flowed to the second catalyst zone to convert at least some of the pollutants into innocuous products. The exhaust gas stream, so treated, is then discharged to the atmosphere through suitable discharge means. A preferred adsorbent is a zeolite, having a relatively high silica to alumina ratio and a low relative Bronsted acidity. The preferred adsorbent compositions comprise beta zeolites.

As discussed above, zeolites are often used as coatings on monolithic substrates for various high temperature adsorption and catalytic applications. In these cases, inorganic binder systems are used that survive exposure to high temperatures (e.g., >500° C.) and provide good coating adhesion. However, for low temperature application (e.g., <500° C.), inorganic type binders are often not suitable since their binding characteristics are severely diminished. In these low temperature applications, organic polymer binders are ideal since they are structurally stable and provide excellent coating adhesion. This is accomplished by the addition of suitable stabilizing agents to the slurry formulation.

For example, commonly assigned U.S. Patent Publication No. 2004/0226440 (published Nov. 18, 2004) discloses a hydrocarbon adsorption unit. The unit is positioned in the air intake system and has an air intake and air outlet. According to the application the adsorber material may be silica gel, a molecular sieve and/or activated carbon and contains an organic polymer binder, as well as an anionic, nonionic or cationic dispersant, that will cause the material to adhere to the surface of a substrate.

Without proper choice of these stabilizing agents, interparticle agglomeration of zeolite particles or coagulation of zeolite and binder particles will occur, thus rendering the slurry unstable for coating application. As a result, a zeolite-based coating formulation must be developed that not only has good adhesion (particularly to metal substrates) at low temperature, but also excellent adsorption characteristics.

As previously mentioned, a major challenge for creating a hydrocarbon adsorber for the air intake system is to minimize the impact of the hydrocarbon adsorber on the air intake restriction. A further challenge is to create a hydrocarbon adsorber that adds little cost to the system, keeps restriction low, and provides sufficient hydrocarbon adsorption capacity for the particular application.

One possible way to accomplish these objectives is disclosed in U.S. Patent Publication No. 2002/0043156, incorporated herein by reference. The '156 publication discloses an integrated air filter and hydrocarbon adsorbing apparatus comprising a filter media disposed in a screen support and an air permeable hydrocarbon adsorbing material disposed between the filter media and the screen support. The '156 publication also discloses, in an alternative embodiment, an integrated air filter and hydrocarbon adsorbing apparatus comprising a hydrocarbon adsorbing coating which is directly disposed on a portion of the air filter. The '156 publication generally discloses the use of any suitable hydrocarbon adsorbing material, however, only exemplifies carbon cloth, carbon fibers, carbon powder, and carbon granules. Furthermore, the '156 publication does not discuss any specific requirements for the use of a coating slurry.

Accordingly, it is the object of this invention to provide a hydrocarbon adsorbent within the air intake system of a motor vehicle for adsorbing volatile hydrocarbons emitted after the engine has been shut-off, and thereby reduce or prevent the emission of such hydrocarbons into the atmosphere.

SUMMARY OF THE INVENTION

An air intake system is provided with a hydrocarbon adsorbent, to remove evaporative emissions generated in an internal combustion engine (hereinafter, referred to as an engine), before the emissions can be released into the atmosphere. During the engine off-cycle, evaporative emissions, which can bleed from the engine and through the air intake system to the atmosphere, are adsorbed by the hydrocarbon adsorbent, thereby reducing evaporative emissions. The air intake system of the present invention comprises an air filter intake duct, a housing, an air filter, an air filter outlet duct, and a hydrocarbon adsorbent associated with at least one part of the air intake system. During engine operation, atmospheric air is introduced into the air intake system, whereby the hydrocarbons, which were previously adsorbed by the hydrocarbon adsorbent are desorbed and circulated back to the engine for combustion through the air filter outlet duct.

In one embodiment, a hydrocarbon adsorbent washcoat slurry can be coated to one or more surfaces of an air intake system. For example, the hydrocarbon adsorbent can be coated to one or more interior surfaces of the air filter intake duct, housing, air filter or air filter outlet duct. The hydrocarbon adsorbent washcoat slurry of the present invention can contain one or more hydrocarbon adsorbents. An undercoat layer can be used to further improve the adhesion of the washcoat slurry to the surface.

In another embodiment, one or more hydrocarbon adsorbent may be incorporated within the air filter of the air intake system. Hydrocarbon adsorbents can be incorporated into the air filter in a variety of different forms and configurations. For example, a powderized or particulate hydrocarbon adsorbent material can be incorporated directly into an air filter during manufacture thereof.

DETAILED DESCRIPTION OF THE INVENTION

The present invention is directed to a hydrocarbon adsorption material for reduction of evaporative emissions (e.g., unburnt hydrocarbons) in a motor vehicle. In particular, this invention is directed to adding hydrocarbon adsorption functionality to a motor vehicle's air intake system with the intent to capture evaporative emissions before the emissions are released to the atmosphere. In one embodiment, the invention describes coating a hydrocarbon adsorbent washcoat slurry to a surface of an air intake system of a motor vehicle. In general, any known surface of the air intake system, which may come in contact with evaporative emissions, can be coated with the hydrocarbon adsorbent and binder of the present invention. Typically, the inner surfaces of the air intake system are exposed to evaporative emissions containing hydrocarbons, thus, making these surfaces ideal for application of the hydrocarbon adsorbent coating to trap hydrocarbons before the hydrocarbons can be released to the ambient atmosphere. In another embodiment, this invention describes incorporating a hydrocarbon adsorbent into an air filter for the reduction of evaporative emissions. Hydrocarbon adsorbents can be incorporated into the air filter in a variety of different forms and configurations. For example, a powderized, granular, or particulate hydrocarbon adsorbent material can be incorporated directly into an air filter during manufacture thereof.

Figure 1:
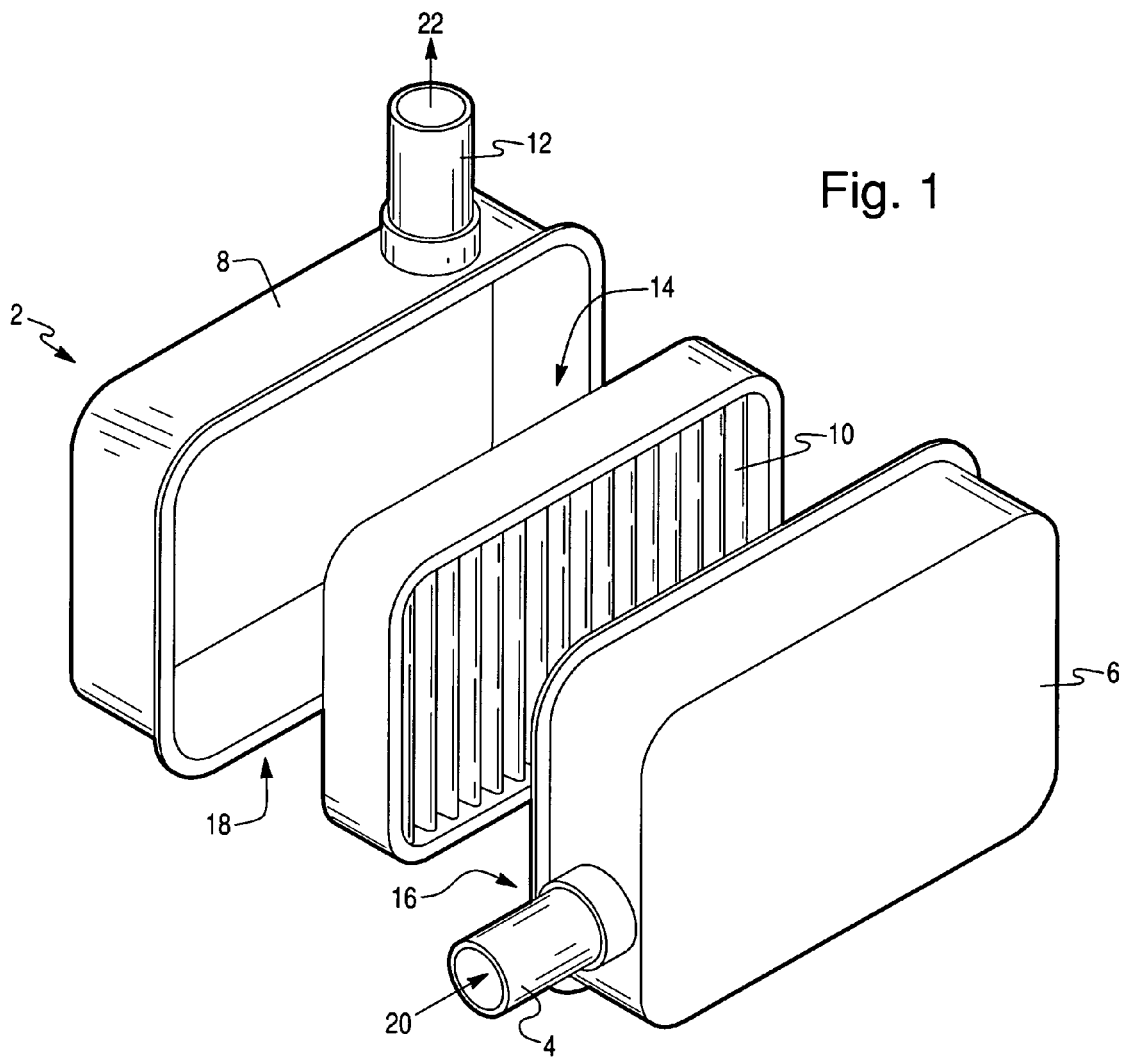
FIG. 1 is an exploded view of an air intake system, in accordance with one embodiment of the present invention.

The air intake system of the present invention may be more readily appreciated by reference to the Figures, which are merely exemplary in nature and are in no way intended to limit the invention or its application or uses. Referring in particular to FIG. 1, an air intake system 2 in accordance with the present invention is shown. The air intake system 2 comprises an air filter intake duct 4, a first housing portion 6, a second housing portion 8, an air filter 10, and an air filter outlet duct 12. The first and second housing portions 6 and 8, respectively, are aligned so as to be juxtapose to each other and define an interior space 14, which houses the air filter 10.

Preferably, the first and second housing portions 6 and 8, respectively, are made of plastic and the two pieces are snap fit together to provide a one-piece air intake system 2, which is installed underneath the hood of a motor vehicle. Alternatively, the first and second housing portions 6 and 8, respectively, may be made of metal or plastic metal composites. Although in the drawing, a rectangular shaped air intake system 2 is shown and described, it should be understood that the air intake system 2 may have different shapes, such as round or oval.

As previously mentioned, the air filter 10 is located in the interior space 14 created by the first and second housing portions 6 and 8, respectively. The air filter 10, functions to absorb dirt and other particulate matter (e.g., dust particles), which may be present in the ambient air and divides the housing into a dirty air portion 16, located upstream from the air filter 10 and a clean air portion 18 located downstream from the air filter 10. It should be recognized that the air filter can be any shape and size.

Figure 2A:
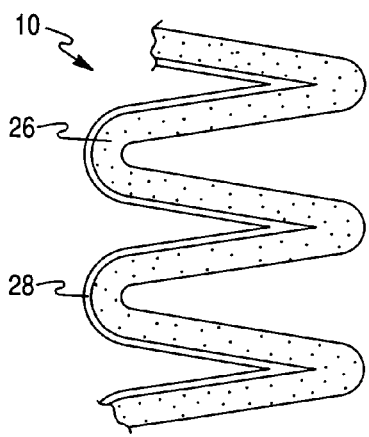
FIG. 2a is an enlarged cross-sectional view of an air filter, in accordance with one embodiment of the present invention.

In FIGS. 2a, an enlarged cross-sectional view of an air filter 10 is shown and is intended to be a non-limiting embodiment of the present invention. Referring to FIGS. 1 and 2a, an air filter 10 is shown, which can be made of compressed fabric or nonwoven fibers 26. In accordance with one embodiment of the present invention, the air filter 10 is coated with a hydrocarbon adsorbent 28. The upstream or dirty air side of the air filter 10, and/or the downstream or clean air side of the air filter 10 can be coated with a hydrocarbon adsorbent 28. As shown, hydrocarbon adsorbent 28 is a layer coated onto the compressed fabric or nonwoven fibers 26. However, in as much as the fabric may be porous, the hydrocarbon adsorbent or adsorbent particles may be captured within the pores of the compressed fabric or between the nonwoven fibers 26. In a preferred embodiment, the downstream or clean air side of the air filter 10 is coated with the hydrocarbon adsorbent 28, as shown in FIG. 2a. In order to allow air to pass through, the air filter 10 is provided with microscopic holes (not shown).

When the engine (not shown) is running, the air intake system 2 draws air in from the environment via the air intake duct 4, represented here as arrow 20. The air is drawn in through the air intake duct 4, into the interior space 14, created by the first and second housing portions 6 and 8, respectively, and through the air filter 10 contained therein. The air filter 10 collects the dirt and other particulate matter, which may be in the ambient air, creating a clean air stream. The clean air stream, represented as arrow 22, exits from the interior space 14, via air filter outlet duct 12. The clean air 22 exiting the air filter material 14 is substantially free of dirt and other particulate matter, and is transported to the engine for use in combustion.

When the engine is switched off, evaporative emissions, typically containing unburnt hydrocarbons, may leak from the engine, and out through the air intake system 2 to the ambient air. Therefore, to prevent evaporative emissions, and in particular hydrocarbons, from escaping to the environment, in accordance with the present invention, the air intake system 2 can be coated with a hydrocarbon adsorbent 28. In general, the hydrocarbon adsorbent 28 can be coated to one or more surfaces of the air intake system 2. Such surfaces can include any interior surface of the air intake system 2, including but not limited to, the interior surfaces of the air filter intake duct 4, the first or second housing portion 6 and 8, respectively, the air filter, or the air filter outlet duct 12.

In the preferred embodiment, the hydrocarbon adsorbent 28 is self-regenerating. Rather than adsorbing hydrocarbons and trapping them in until the hydrocarbon adsorbent 28 is saturated, the hydrocarbons may be relatively easily released from the hydrocarbon adsorbent 28, when the engine is running. Preferably, when air passes through the air intake system 2, during engine operation, the hydrocarbons trapped in the hydrocarbon adsorbent 28 are released from the hydrocarbon adsorbent 28, and travel through the air filter outlet duct 12 to the engine, where they can be combusted.

Figure 2B:
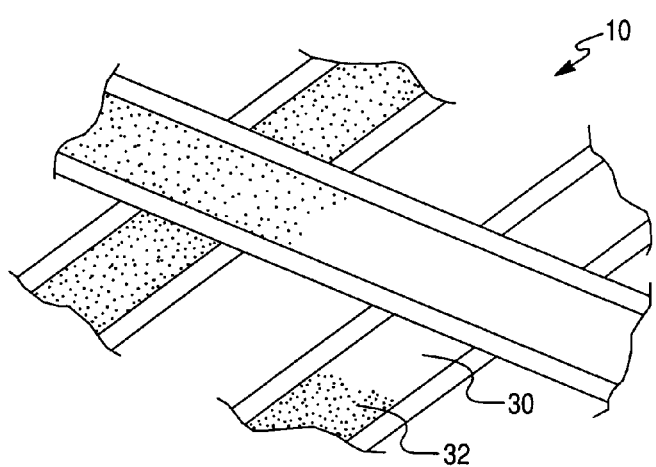
FIG. 2b is an enlarged view of an air filter, in accordance with another embodiment of the present invention.

FIG. 2b shows an alternative embodiment of the air filter 10, in accordance with the present invention. Referring to FIGS. 1 and 2b, an enlarged schematic view of the fibers 30 of an air filter 10 are shown. In this embodiment of the present invention, the fibers 30 can contain therein one or more hydrocarbon adsorbent materials 32. Typically, the hydrocarbon adsorbent materials 32 used in this embodiment is a powdered, granular, or particulate form of a hydrocarbon adsorbent, which can be incorporated directly into the fibers 30 making up the air filter 10 during manufacture thereof. Hydrocarbon adsorbents can be incorporated into the air filter in a variety of different forms and configurations. For example, in one embodiment, a zeolite powder can be extruded into granules of any size or shape or spray dried into larger coarse particles and incorporated directly into the air filter for the purpose of adsorbing hydrocarbon vapors in the air intake system.

The hydrocarbon adsorbent may be silica gel, a molecular sieve, activated carbon or mixture thereof. The material may be disposed within the housing as a single layer or separate layers of silica gel, a molecular sieve or activated carbon. Preferably, the material comprises a molecular sieve alone or in admixture with about 5 to about 50 weight percent of an activated carbon having a pore size of about 5 to about 500 angstroms. In a particularly preferred embodiment, the hydrocarbon adsorbent of the present invention is a zeolite-based hydrocarbon adsorbent or adsorbent slurry.

The zeolite-based hydrocarbon adsorbent or adsorbent slurry of the present invention comprises one or more zeolite hydrocarbon adsorbents and optionally a binder. The adsorbent material may include any known natural or synthetic zeolite such as faujasite, chabazite, clinoptilolite, mordenite, silicalite, zeolite X, zeolite Y, ultrastable zeolite Y, ZSM zeolite, offretite, or a beta zeolite. Preferred zeolites include ZSM, Y and beta zeolites. The particularly preferred adsorbent comprises a beta zeolite of the type disclosed in U.S. Pat. No. 6,171,556 incorporated herein by reference in its entirety.

A preferred zeolite-based adsorbent material is a zeolite having a high silica to alumina ratio. Generally, sieve materials having so-called three dimensional pore configurations are preferred over sieve materials having one- or two-dimensional pore configurations, although some of the latter function acceptably well. Acceptable materials typically have a micropore diameter of from about 3 to 8 angstroms. The zeolites, preferably beta zeolites may have a silica/alumina molar ratio of from at least about 25/1, preferably at least about 50/1, with useful ranges of from about 25/1 to 1000/1, 50/1 to 500/1 as well as about 25/1 to 300/1, from about 100/1 to 250/1, or alternatively from about 35/1 to 180/1 is also exemplified. The preferred beta zeolites are ion-exchanged beta zeolites, such as H/beta zeolite and Fe/beta zeolite.

As previously mentioned, preferred zeolites may include ZSM, Y and beta zeolites, with beta zeolites particularly preferred. The preferred zeolites can be treated to reduce the number of acid sites. This can be accomplished by leaching the zeolite with an organic or inorganic acid. Preferred acids include strong inorganic acids, such as sulfuric acid, nitric acid, hydrochloric acid, phosphoric acid and the like, and carboxylic acids such as trifluoro acetic acid, and dicarboxylic acids such as oxalic, malonic, succinic, glutaric, adipic, maleic, fumaric, phthalic and the like. Useful acids preferably include polyacids, preferably difunctional acids, more preferably dicarboxylic acids with oxalic acid most preferred. The acid use is at a concentration of 0.02 to 12N, preferably 0.1 to 10N, and a solid zeolite concentration of 0.01 to 1.0 g/ml and preferably 0.05 to 0.5 g/ml. The leaching is conducted at a suitable temperature range, typically of from 10 to 100° C.; for example, preferably at 70 to 100° C. when using sulfuric acid and from 10 to 50° C. when using oxalic acid. The leaching is conducted for a sufficient time to achieve the desired silica to alumina ratio attainable at the leach conditions and concentrations, and is typically from about 0.5 to 5 hours, and preferably 0.5 to 3 hours.

The zeolite can be steam treated with steam at from 350 to 900° C. Preferably, the stream treatment is conducted at from 400 to 800° C., and more preferably 500 to 750° C. with a most preferred range being from 550 to 750° C. The steam temperature can be increased at a suitable rate such as from 100 to 600° C. per hour. A useful steam concentration is from 10 to 100% and preferably 30 to 100% with a preferred concentration at from about 50 to 100% with the balance being air. The steaming is preferably conducted at atmospheric pressure. The duration of the steam treatment is sufficient to treat the zeolite and is typically from 0.5 to 48 hours, preferably 0.5 to 24 hours, more preferably from 0.5 to 8 hours and most preferably 0.5 to 5 hours. The steam treatment is believed to reduce the acidity of the zeolite by removing at least some of the aluminum from the framework of the zeolite. Steam treated zeolites have been found to have an increased durability when used to adsorb hydrocarbons in gaseous streams and to resist coke formation. Preferably, the zeolite can be treated with both leaching and steam treatment. In a particularly preferred process, the zeolite is first acid leached followed by steam treatment. Optionally, the steps of steam treatment and steaming can be repeated in any desired order. For example, leached and steamed zeolite can be repeatedly leached followed by steaming. In a specific embodiment the zeolite can be leached, steamed and leached again.

A useful method to treat beta zeolite is disclosed, for example in CN 1059701A, published Mar. 25, 1992 and herein incorporated by reference. This reference discloses a high Si beta zeolite produced by calcining to remove nitrogen compounds from a beta zeolite made through an organoamine template process. Leaching the beta zeolite is accomplished with an organic or inorganic acid solution having a concentration of 0.02 to 12N, preferably 0.1 to 10N, and a solid zeolite concentration of 0.01 to 1.0 g/ml and preferably 0.05 to 0.5 g/ml at from 10 to 100° C. for 0.5 to 5 hours, and preferably 1 to 3 hours. The leaching is followed by treating the zeolite with steam at from 400 to 900° C. with the steam temperature increasing at from 100 to 600° C. per hour. A useful steam concentration is 100% at a system pressure of 50 to 500 KPa. The duration of the steam treatment is from 0.5 to 5 hours.

Of particular interest with regard to the present invention is the acidity, which is imparted by the alumina in the zeolite framework. It is believed that the high silica to alumina ratio attained by leaching is related to the acidity of the zeolite. The acidity of the zeolite is believed to affect the durability of the zeolite when used to adsorb hydrocarbons from exhaust streams such as automotive and industrial exhaust steams, which are typically at temperatures in the range of from 300 to 800° C. and more typically from 350 to 600° C. The zeolite, when used in such environments tends to lose adsorption efficiency due primarily to clogging of the pores and/or collapse of the zeolite framework. Maintenance of the stable zeolite framework can be attained by controlling the conditions under which the zeolite is treated. Such conditions include acid concentrations, steam temperatures and the like. Milder conditions reduce the tendency for the zeolite framework to deteriorate during treatment and permit the framework to be stabilized at the location where the alumina was removed.

Additionally, it is believed that steam treatment removes aluminum from the zeolite framework. The affected aluminum continues to reside in the zeolite, probably in the pores. The zeolite framework is believed to stabilize without the aluminum and the aluminum ions in the pores becomes alumina. The remaining alumina in the pores is believed not contribute to the acidity of the zeolite which is reduced. The alumina in the pores can remain or be washed or leached out in a subsequent leaching step.

The zeolite, non-steamed or steamed, has been found to have improved coking resistance, i.e., the formation of coke during engine testing has been significantly reduced. While acid leaching methods to increase the silica to alumina ratio of a zeolite are known to decrease acidity, such methods are believed to remove aluminum atoms from zeolite particles indiscriminately. Methods such as steaming remove the aluminum from the framework of the zeolite preferentially at the Bronsted acid sites. The importance of this can be recognized by both more effective resistance to coking and by the knowledge of how to treat a zeolite to attain such performance with minimizing deterioration of the framework. In essence, leaching a zeolite to death will result in reduced Bronsted acidity; but using a method such as steam treatment alone, or more preferably balanced with leaching results in a more durable zeolite for use as a hydrocarbon adsorber in accordance with the present invention.

In one embodiment, the air intake system surface can be precoated with a slurry of a high surface area refractory metal oxide, dried for about 0.5 to about 2 hours at about 90 to about 120° C. and thereafter calcined at about 450 to about 650° C. for 0.5 to about 2 hours. When the air intake system surface cannot withstand the high temperatures required for calcination (e.g., a plastic air duct) the precoat slurry can be dried, for example, at 90° C. High surface area refractory metal oxides are well known in the prior art. Typically, the refractory metal oxide will have a specific surface area of about 60 to about 300 m$^2$/g. Useful refractory metal oxides include aluminum oxide, cerium oxide, zirconium oxide, gamma-alumina, alumina, titania, zirconia and mixtures of alumina with one or more of titania, zirconia, ceria, baria and a silicate. Preferably, the refractory metal oxide comprises gamma-alumina.

Thereafter, the refractory metal oxide-coated surface is coated with a slurry of the desired adsorbent and dried (e.g., at about 105° C.). Alternatively, the refractory metal oxide-coated surface may be coated with separate slurries of the hydrocarbon adsorbent, such as silica gel, molecular sieve and/or activated carbon to create layers, with drying between each layer occurring as described above.

If desired, a further top coat layer of the high surface area refractory metal oxide may be applied on top of the adsorbent, thereafter drying as described above after the application of each layer.

The hydrocarbon adsorbent slurry, e.g., a zeolite-based slurry, will also include a binder that will cause the material to adhere to the air intake system surface. Such a binder is also referred to as a washcoat binder. Washcoat binders typical for use in the formulation of slurries include, but are not restricted to, the following: organic polymers; sols of alumina, silica or zirconia; inorganic salts, organic salts and/or hydrolysis products of aluminum, silica or zirconium; hydroxides of aluminum, silica or zirconium; organic silicates that are hydrolyzable to silica; and mixtures thereof.

The preferred binder is an organic polymer used in amounts of from 0.5 to 20, preferably 2 to 10, percent by weight of binder based on the weight of the material. The organic polymer may be a thermosetting or thermoplastic polymer and may be plastic or elastomeric. The polymeric binder may contain suitable stabilizers and age resistors known in the polymeric art. Most preferred are thermosetting, elastomeric polymers introduced as a latex into the adsorbent composition, preferably as an aqueous slurry. Upon application of the composition and drying, the binder material fixes the hydrocarbon adsorbent particles to themselves and the substrate surface, and in some cases, can crosslink with itself to provide improved adhesion. This enhances the integrity of the coating, its adhesion to the substrate surface and provides structural stability under vibrations encountered in motor vehicles. The use of a binder enables the material to adhere to the substrate surface without the necessity of an undercoat layer. The binder may also comprise additives to improve water resistance and improve adhesion.

Useful organic polymer binder compositions include polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly (vinyl halides), polyamides, cellulosic polymers, polyimides, acrylics, vinyl acrylics and styrene acrylics, polyvinyl alcohol, thermoplastic polyesters, thermosetting polyesters, poly (phenylene oxide), poly(phenylene sulfide), fluorinated polymers such as poly(tetrafluoroethylene) polyvinylidene fluoride, poly(vinylfluoride) and chloro/fluoro copolymers such as ethylene chlorotrifluoro-ethylene copolymer, polyamide, phenolic resins and epoxy resins, polyurethane, acrylic/styrene acrylic copolymer latex and silicone polymers. A particularly preferred polymeric binder is an acrylic/styrene acrylic copolymer latex.

It has been found that compatibility of the components of a slurry comprising a hydrocarbon adsorbent material and a polymeric binder, such as a latex emulsion, is important for maintaining slurry stability and uniformity. For the purpose of the present invention compatibility means that the binder and the hydrocarbon adsorbent material remain as a mixture of separate particles in the slurry. It is believed that when the polymeric binder is a latex emulsion and the emulsion and hydrocarbon adsorbent material have electrical charges which cause the emulsion and hydrocarbon adsorbent material to repel each other, the emulsion and hydrocarbon adsorbent material are compatible and the slurry is stable and has a uniform distribution of the hydrocarbon adsorbent material and the polymer latex in the liquid vehicle, e.g. aqueous fluid such as water. If the hydrocarbon adsorbent material and latex emulsion particles do not mutually repel each other, irreversible agglomeration of the latex on the hydrocarbon adsorbent material will occur. These materials are therefore incompatible and the latex comes out of the emulsion.

For those zeolites that generate a low pH mixture when dispersed in water, additional stabilization can be achieved by increasing the pH. This is important since organic latex binder emulsions commonly used in the art are anionically charged and therefore, typically have a pH greater than 7. Combining a high pH binder emulsion with a low pH zeolite slurry creates instability that often results in slurry coagulation. The pH of the slurry can be controlled depending on the acidity of the adsorbent material, with pH levels being from about 4 to about 10. A preferred range is from about 5 to about 8, more preferably from about 6 to about 7.5.

In another embodiment, it is preferred to use a dispersant in conjunction with the binder. The dispersant may be anionic, non-ionic or cationic and is typically utilized in an amount of about 0.1 to about 10 weight percent, based on the weight of the material. Not surprisingly, the specific choice of dispersant is important. Suitable dispersants may include polyacrylates, alkoxylates, carboxylates, phosphate esters, sulfonates, taurates, sulfosuccinates, stearates, laureates, amines, amides, imidazolines, sodium dodecylbenzene sulfonate, sodium dioctyl sulfosuccinate and mixtures thereof. In one embodiment, a preferred dispersant is a low molecular weight polyacrylic acid in which many of the protons on the acid are replaced with sodium. In a particularly preferred embodiment, low molecular weight anionic dispersants such as sodium dodecylbenzene sulfonate and sodium dioctyl sulfosuccinate have been found to provide excellent zeolite dispersion and zeolite-binder stability. For example, in the case of slurry formulated with high Si/Al ratio SAL-Beta zeolite (i.e., sulfuric acid leached beta zeolite) and styrene-acrylic latex binder emulsion, low molecular weight anionic dispersants have been found to provide excellent zeolite dispersion and zeolite-binder stability. A preferred composite comprising about 90 weight percent beta zeolite, about 9 weight percent acrylic polymer latex and about 1 weight percent sodium dodecylbenzene sulfonate or sodium dioctyl sulfosuccinate.

While increasing the slurry pH or adding anionic dispersant alone may provide enough stabilization for the slurry mixture, best results may be obtained when both an increased pH and anionic dispersant are used. For example, for zeolite-based slurries that generate a low pH when dispersed in water and/or a dispersant, additional stabilization can be achieved by increasing the pH, as described above.

The hydrocarbon adsorbent slurries of the present invention, particularly slurries containing polymer latexes, can contain conventional additives such as thickeners, biocides, antioxidants and the like. In one embodiment, a thickener such as a xanthan gum thickener or a carboxymethylcellulose thickener can be used. The thickener makes it possible to achieve a sufficient amount of coating (and hence sufficient hydrocarbon adsorption capacity) on relatively low surface area substrates. The thickener may also serve in a secondary role by increasing slurry stability by steric hinderence of the dispersed particles. It may also aid in the binding of the coating surface.

The improved hydrocarbon adsorbent slurry of the present invention can be applied to the air intake system surface by any known means in the art. For example, the slurry can be applied by spray coating, powder coating, or brushing or dipping a surface into the slurry.

What is claimed is:

1. An air intake system for reducing evaporative emissions from a motor vehicle,
    wherein said air intake system comprises a plastic air filter housing, wherein one or more interior surfaces of said housing comprises a hydrocarbon adsorbent coat comprising:
        a) one or more hydrocarbon adsorbents for the adsorption of hydrocarbons; and
        b) an organic polymer binder to improve the adhesion of said hydrocarbon adsorbent to said one or more surfaces of said air intake system,
    wherein the hydrocarbon adsorbent comprises zeolite and the organic polymer binder comprises acrylic/styrene acrylic copolymer latex.

2. The air intake system of claim 1, wherein said air intake system comprises an air filter intake duct, an air filter, and an air filter outlet duct.

3. The air intake system of claim 1, wherein said zeolite hydrocarbon adsorbent is selected from the group consisting of faujasite, chabazite, clinoptilolite, mordenite, silicalite, zeolite X, zeolite Y, ultrastable zeolite Y, ZSM zeolite, offretite, and beta zeolite.

4. The air intake system of claim 3, wherein said hydrocarbon adsorbent is beta zeolite.

5. The air intake system of claim 1, wherein a hydrocarbon adsorbent washcoat slurry comprising a slurry pH from about 4 to about 10 to stabilize said slurry is coated on said one or more interior surfaces.

6. The air intake system of claim 1, wherein said hydrocarbon adsorbent coat further comprises an anionic dispersant selected from the group consisting of sodium dodecylbenzene sulfonate and sodium dioctyl sulfosuccinate.

7. An air filter housing for reducing evaporative emissions, wherein said air filter housing is plastic and one or more interior surfaces of said housing comprises a zeolite-based hydrocarbon adsorbent coat comprising zeolite and an organic polymer binder comprising acrylic/styrene acrylic copolymer latex.

8. The air filter housing of claim 7, wherein said zeolite-based hydrocarbon adsorbent is selected from the group consisting of faujasite, chabazite, clinoptilolite, mordenite, silicalite, zeolite X, zeolite Y, ultrastable zeolite Y, ZSM zeolite, offretite, and beta zeolite.

9. The air filter housing of claim 8, wherein said zeolite-based hydrocarbon adsorbent is beta zeolite.

10. The air filter housing of claim 9, wherein a zeolite-based hydrocarbon adsorbent washcoat slurry comprising a slurry pH from about 4 to about 10 to stabilize said slurry is coated on said one or more interior surfaces.

11. The air filter housing of claim 9 wherein said zeolite-based hydrocarbon adsorbent coat further comprises an anionic dispersant selected from the group consisting of sodium dodecylbenzene sulfonate and sodium dioctyl sulfosuccinate.

12. The air intake system of claim 1, wherein said hydrocarbon adsorbent washcoat slurry further comprises a thickener selected from the group consisting of xanthan gum and carboxymethylcellulose.

13. The air intake system of claim 4, wherein said beta zeolite is acid leached beta zeolite.

14. The air filter housing of claim 7, wherein said hydrocarbon adsorbent washcoat slurry further comprises a thickener selected from the group consisting of xanthan gum and carboxymethylcellulose.

15. The air filter housing of claim 9, wherein said beta zeolite is acid leached beta zeolite.

* * * * *